B. CLOW.
HORSE OVERSHOE.
APPLICATION FILED APR. 20, 1909.
955,765.
Patented Apr. 19, 1910.
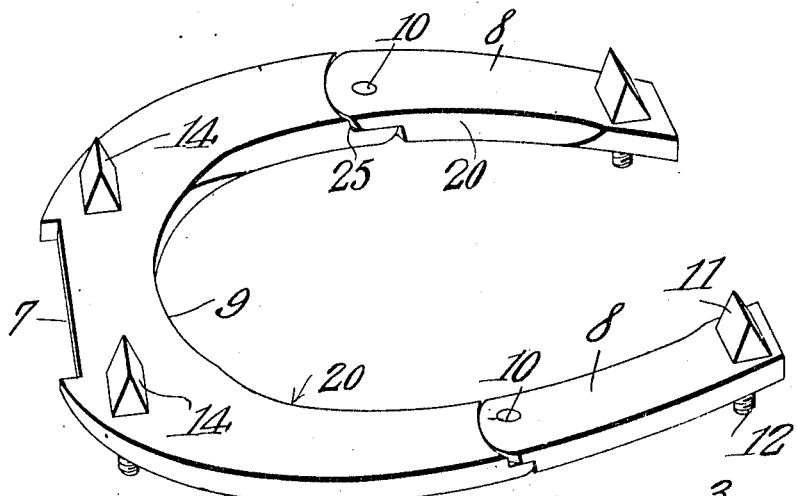
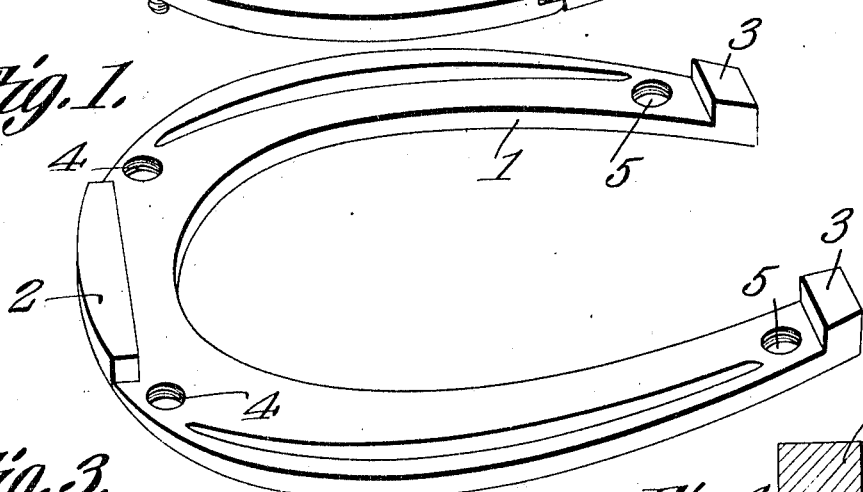
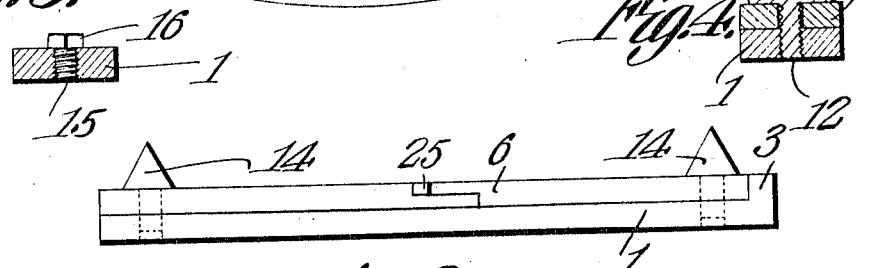
Inventor
Benjamin Clow.
Witnesses
By C. A. Snow & Co.
Attorneys

UNITED STATES PATENT OFFICE.

BENJAMIN CLOW, OF DALTON, MASSACHUSETTS.

HORSE-OVERSHOE.

955,765.

Specification of Letters Patent. Patented Apr. 19, 1910.

Application filed April 20, 1909. Serial No. 491,004.

*To all whom it may concern:*

Be it known that I, BENJAMIN CLOW, a citizen of the United States, residing at Dalton, in the county of Berkshire and State of Massachusetts, have invented a new and useful Horse-Overshoe, of which the following is a specification.

The objects of the invention are, generally, the provision, in a merchantable form, of a device of the class above described, which shall be inexpensive to manufacture, facile in operation and devoid of complicated parts; specifically, the provision of a creeper section of novel and improved form, designed to be assembled with a hoof section; the provision of calks adapted to assemble the creeper section with the hoof section; other and further objects being made manifest hereinafter as the description of the invention progresses.

The invention consists in the novel construction and arrangement of parts hereinafter described, delineated in the accompanying drawings and particularly pointed out in that portion of this instrument wherein patentable novelty is claimed for certain distinctive and peculiar features of the device, it being understood that within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings:—Figure 1 shows my invention in perspective, the creeper section being vertically spaced from the hoof section; Fig. 2 is a side elevation; Fig. 3 is a transverse section of the hoof section, showing a filling block inserted in one of the apertures therein; and Fig. 4 is a transverse section through one of the auxiliary calks, the creeper section and the hoof section.

In carrying out my invention, I provide, primarily, a hoof section 1, in the form of a complete shoe. This hoof section 1 may be mounted upon the hoof of the draft animal in the usual manner. The hoof section 1 is provided with a toe calk 2 and with the usual heel calks 3. Near the extremities of the toe calk 2, the hoof section 1 is provided with apertures 4, which are duplicated at the heel by apertures 5, disposed in relatively close relation to the heel calks 3. I further provide a creeper section, denoted generally by the numeral 6, conforming in shape to the hoof section 1. This creeper section 6 is adapted to be superposed upon the hoof section 1, and is provided at its toe with a notch 7, adapted to receive the toe calk 2 of the hoof section 1.

The creeper section 6 comprises a body portion 9, which, at its extremities, is halved to receive the extremities of the heels 8, which are pivotally assembled at 10, with the said body portion. The creeper section 6 is provided with apertures designed to receive calks 14, the apertures being in alinement with the apertures 4 and 5 of the hoof section. The calks comprise a head 11, adapted to engage the lower face of the creeper section 6, and a shank 12, adapted to be passed through the creeper section 6 to engage the apertures 4 and 5 in the hoof section 1, it being understood that the apertures 4 and 5 are threaded, and that the shanks 12 of the calks are threaded to engage the apertures.

The hoof section 1 represents the ordinary horse shoe of commerce, which may be adapted to receive the creeper section by the insertion of the apertures 4 and 5. By pivoting the heels of the creeper section to the body 9 thereof, a single creeper section may be adapted to fit a series of hoof sections, or shoes, having a variety of shapes. This pivotal connection between the heels and the body of the creeper section further enables the extremities of the said heels to be brought into firm abutment with the heel calks 3 whereby the heels may be limited against further outward movement.

In practical operation, the creeper section is superposed upon the hoof section, the notch 7 in the former engaging the toe calk 2 of the latter. The contour of the apertures 4 is marked upon the hoof section, the heels 8 are moved laterally to bring their extremities into abutment with the heel calks 3, and the apertures 5 are marked upon the hoof section. The creeper section is then removed and the apertures 4 and 5 are bored and threaded. When it is subsequently desired to assemble the creeper section 6 with the hoof section 1, the same are placed together, and the calks 14 are rotated in place to clamp the sections together.

By the foregoing operation, a horse shod with a summer shoe, may be sharp-shod in a few moments, and without calling into requisition the services of a farrier. With equal facility, the creeper section 6 may be removed from the hoof section 1, the shoeing of the animal being changed thereby from a winter to a summer equipment. In the fall of the year it is frequently desirable to have draft animals shod alternately for ice and for frozen ground, and, by means of my invention, the change from the one form of shoeing to the other may be accomplished readily. The device renders unnecessary the pulling of the shoes from the feet of the draft animal whenever it is desired to change the character of the shoeing. It will also be noted that the calks 14 may readily be removed from the shoe at any time, for sharpening. The peculiar triangular shape of the cross section of the head of the calk makes it possible for a farmer to sharpen the same readily upon a grind-stone, or with a file.

If desired, filling plugs 15 may be provided, adapted to be screwed into the apertures 4 and 5 in the hoof section, when the same is used without the creeper section 6. These filling plugs may be threaded to engage the apertures 4 and 5 and provided with a head 16, whereby they may be turned to place and removed. These filling plugs 15 prevent the apertures 4 and 5 from becoming filled with dirt during the summer season, and further prevent the threads upon the interior of the apertures 4 and 5 from becoming so broken or injured, that the creeper section 6 cannot be quickly mounted to place when desired.

As shown in Fig. 1, and denoted by the numeral 20, the adjacent faces of the creeper section are cut away in the vicinity of the pivotal connection between the body 9 and the heels 8 to decrease the width of the creeper section. The adjacent end faces of the heels and of the body are spaced apart as denoted by the numeral 25, at the inner and outer edges of the creeper section. If, when the free extremities of the heels 8 are brought into abutment with the heel calks 3, the creeper section should not aline perfectly with the hoof section, by driving the free ends of the heels 8 into close contact with the heel calks 3, the creeper section may be made to spring adjacent the pivotal union between the heels 8 and the body portion 9, this yielding of the creeper section being promoted by its diminished width adjacent the aforesaid pivotal connection, and further, by the fact that the adjacent end faces of the heels and the body are spaced apart at the inner and outer edges of the creeper section as denoted by the numeral 25.

Having thus described my invention, what I claim as new, and desire to protect, by Letters Patent is:—

A device of the class described comprising a hoof section in the form of an integral shoe provided with toe and heel calks; a creeper section adapted to be superposed upon the hoof section, the said creeper section comprising a body portion adapted to receive the toe calk of the hoof section, and separately movable heels pivotally connected with the body portion; the heel calks of the hoof section being arranged to receive the free extremities of the heels to limit the heels against outward movement; and removable calks for holding the creeper section upon the hoof section; the inner edge of the creeper section being provided with a striking face extended upon both the body and the heels, and inclined toward the outer edge of the creeper section; the adjacent ends of the heels and the body being spaced apart adjacent the striking face.

In testimony that I claim the foregoing as my own, I have hereto affixed my signature in the presence of two witnesses.

BENJAMIN CLOW.

Witnesses:
 HENRY A. BREWSTER,
 ROBERT T. PARKER.